United States Patent
Zhao et al.

(10) Patent No.: US 10,698,766 B2
(45) Date of Patent: Jun. 30, 2020

(54) OPTIMIZATION OF CHECKPOINT OPERATIONS FOR DEEP LEARNING COMPUTING

(71) Applicant: EMC IP Holding Company LLC, Hopkinton, MA (US)

(72) Inventors: Junping Zhao, Beijing (CN); Dragan Savic, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 116 days.

(21) Appl. No.: 15/956,193

(22) Filed: Apr. 18, 2018

(65) Prior Publication Data
US 2019/0324856 A1    Oct. 24, 2019

(51) Int. Cl.
| | |
|---|---|
| G06F 11/00 | (2006.01) |
| G06F 11/14 | (2006.01) |
| G06T 1/20 | (2006.01) |
| G06K 9/62 | (2006.01) |
| G06F 9/46 | (2006.01) |
| G06T 1/60 | (2006.01) |

(Continued)

(52) U.S. Cl.
CPC .......... *G06F 11/1407* (2013.01); *G06F 9/461* (2013.01); *G06F 9/4881* (2013.01); *G06K 9/6257* (2013.01); *G06N 20/00* (2019.01); *G06T 1/20* (2013.01); *G06T 1/60* (2013.01)

(58) Field of Classification Search
CPC . G06N 3/08; G06N 20/00; G06N 5/02; G06F 2201/84; G06K 9/6256; G06T 2207/20081; G09G 2360/06; G09G 5/363
See application file for complete search history.

(56) References Cited

U.S. PATENT DOCUMENTS

| | | |
|---|---|---|
| 6,888,831 B1 | 5/2005 | Hospodor et al. |
| 8,938,416 B1 | 1/2015 | Cole et al. |

(Continued)

OTHER PUBLICATIONS

U.S. Appl. No. 15/498,055 filed in the name of Jumping Zhao et al. filed Apr. 26, 2017 and entitled "Intelligent Data Coordination for Accelerated Computing in Cloud Environment."

(Continued)

*Primary Examiner* — Loan L. T. Truong
(74) *Attorney, Agent, or Firm* — Ryan, Mason & Lewis, LLP

(57) ABSTRACT

Systems and methods are provided to optimize checkpoint operations for deep learning (DL) model training tasks. For example, a distributed DL model training process is executed to train a DL model using multiple accelerator devices residing on one or more server nodes, and a checkpoint operation is performed to generate and store a checkpoint of an intermediate DL model. A checkpoint operation includes compressing a checkpoint of an intermediate DL model stored in memory of a given accelerator device to generate a compressed checkpoint, and scheduling a time to perform a memory copy operation to transfer a copy of the compressed checkpoint from the memory of the given accelerator device to a host system memory. The scheduling is performed based on information regarding bandwidth usage of a communication link to be utilized to transfer the compressed checkpoint to perform the memory copy operation, wherein the memory copy operation is performed at the scheduled time.

20 Claims, 7 Drawing Sheets

(51) Int. Cl.
*G06F 9/48* (2006.01)
*G06N 20/00* (2019.01)

(56) References Cited

U.S. PATENT DOCUMENTS

| | | | |
|---|---|---|---|
| 9,836,354 B1 | 12/2017 | Potlapally et al. | |
| 9,984,648 B2 | 5/2018 | Chakraborty et al. | |
| 10,158,859 B2* | 12/2018 | Nowozin | H04N 19/149 |
| 10,275,851 B1* | 4/2019 | Zhao | G06T 1/20 |
| 10,497,105 B2* | 12/2019 | Cardei | G06K 9/4661 |
| 2008/0195843 A1 | 8/2008 | Muniandy | |
| 2009/0089560 A1 | 4/2009 | Liu et al. | |
| 2010/0122199 A1* | 5/2010 | Darrington | H04L 63/0227 715/771 |
| 2011/0131430 A1 | 6/2011 | Krishnarnurthy et al. | |
| 2012/0011401 A1 | 1/2012 | Ranganathan et al. | |
| 2012/0036106 A1* | 2/2012 | Desai | G06F 11/2094 707/645 |
| 2014/0198112 A1 | 7/2014 | Miyamoto et al. | |
| 2014/0325073 A1 | 10/2014 | Urbach | |
| 2015/0095598 A1* | 4/2015 | Abou Gazala | G06F 9/46 711/162 |
| 2015/0213163 A1 | 7/2015 | Yang et al. | |
| 2015/0254555 A1* | 9/2015 | Williams, Jr. | G06N 3/0454 706/14 |
| 2015/0271331 A1 | 9/2015 | Segre et al. | |
| 2015/0317192 A1 | 11/2015 | Munshi et al. | |
| 2015/0363225 A1* | 12/2015 | Cher | G06F 9/4818 718/108 |
| 2015/0363277 A1* | 12/2015 | Cher | G06F 11/1438 714/19 |
| 2016/0247248 A1* | 8/2016 | Ha | G06F 9/455 |
| 2017/0220949 A1 | 8/2017 | Feng et al. | |
| 2017/0262299 A1* | 9/2017 | Chow | G06F 9/455 |
| 2017/0293758 A1 | 10/2017 | Saxena et al. | |
| 2017/0353397 A1 | 12/2017 | Che | |
| 2017/0364795 A1* | 12/2017 | Anderson | G06N 20/00 |
| 2018/0032862 A1* | 2/2018 | Oliner | G06N 3/0445 |
| 2018/0063538 A1* | 3/2018 | Bernal | G06K 9/03 |
| 2018/0075347 A1 | 3/2018 | Alistarh et al. | |
| 2018/0101770 A1* | 4/2018 | Tanaka | G06N 3/0454 |
| 2018/0144214 A1* | 5/2018 | Hsieh | G06T 7/0012 |
| 2018/0189635 A1* | 7/2018 | Olarig | G06N 3/08 |
| 2018/0203728 A1* | 7/2018 | Yan | G06F 9/4881 |
| 2018/0218257 A1* | 8/2018 | Xu | G06F 9/4806 |
| 2018/0261020 A1* | 9/2018 | Petousis | G07C 5/008 |
| 2018/0349482 A1* | 12/2018 | Oliner | H04L 41/5009 |
| 2018/0365309 A1* | 12/2018 | Oliner | G06F 16/903 |
| 2019/0034367 A1* | 1/2019 | Kakaiya | G06F 13/20 |
| 2019/0042515 A1* | 2/2019 | Guim Bernat | G06F 13/4068 |
| 2019/0042518 A1* | 2/2019 | Marolia | G06F 13/4221 |
| 2019/0065284 A1* | 2/2019 | Sardino | G05B 23/0251 |
| 2019/0066257 A1* | 2/2019 | Daga | H04N 19/176 |
| 2019/0102676 A1* | 4/2019 | Nazari | G06N 20/00 |
| 2019/0171935 A1* | 6/2019 | Agrawal | G06N 3/08 |
| 2019/0197395 A1* | 6/2019 | Kibune | G06N 3/08 |
| 2019/0205747 A1* | 7/2019 | Srivastava | G06K 9/3241 |
| 2019/0251279 A1* | 8/2019 | Emberson | H04L 63/0227 |
| 2019/0258920 A1* | 8/2019 | Lie | G06F 9/30036 |
| 2019/0268807 A1* | 8/2019 | Babu | H04W 28/0284 |
| 2019/0286987 A1* | 9/2019 | Lie | G06N 3/0481 |
| 2019/0327342 A1* | 10/2019 | Cui | G06N 20/00 |
| 2020/0082272 A1* | 3/2020 | Gu | G06N 3/088 |

OTHER PUBLICATIONS

U.S. Appl. No. 15/496,568 filed in the name of Junping Zhao et al. filed Apr. 25, 2017 and entitled "Checkpointing for GPU-as-a-Service in Cloud Computing Environment."

U.S. Appl. No. 15/391,223 filed in the name of Yifan Sun et al. filed Dec. 27, 2016 and entitled "Queue-Based GPU Virtuaiization and Management System."

U.S. Appl. No. 15/487,887 filed in the name of Yifan Sun et al, filed Apr. 14, 2017 and entitled "Managing Access to a Resource Pool of Graphics Processing Units Under Fine Grain Control."

amazon.com, "Linux Accelerated Computing Instances," http://docs.aws.amazon.com/AWSEC2/latest/UserGuide/using_cluster_computing.html, 9 pages.

Tiffany Trader, "Microsoft Puts GPU Boosters on Azure Cloud," https://www.hpcwire.corn/2016/09/29/microsoft-puts-gpu-boosters-on-azure-cloud/, Sep. 29, 2015, 3 pages.

Tony Paikeday, "Seven Service Providers Delivering the GPU-Accelerated Cloud—Built on NVIDIA Grid," https://blogs.nvidia.com/blog/2016/09/27/the-gpu-accelerated-cloud/, Sep. 27, 2016, 4 pages.

Minsoo Rhu et al., "vDNN: Virtualized Deep Neural Networks for Scalable, Memory-Efficient Neural Network Design," 49th IEEE/ACM International Symposium on Microarchitecture (Micro-49), 2016, 13 pages.

U.S. Appl. No. 15/895,642 filed in the name of Dragan Savic et al. filed Feb. 13, 2018 and "Optimization of Graphics Processing Unit Memory for Deep Learning Computing."

Tensorflow, "Tensor/Tensorflow," https://github.com/tensorflow/tensorflow/blob/master/tensorflow/python/training/saver.py, 2015, 32 pages.

S. Han et al., "Deep Compression: Compressing Deep Neural Networks with Pruning, Trained Quantization and Huffman Coding," arXiv:1510.00149v5, Published as a conference paper at International Conference on Learning Representations (ICLR), Feb. 16, 2016, 14 pages.

* cited by examiner

200

300

OPTIMIZATION OF CHECKPOINT OPERATIONS FOR DEEP LEARNING COMPUTING

FIELD

This disclosure relates generally to techniques to provide checkpoint functions and services in a distributed high-performance computing environment.

BACKGROUND

Various types of special-purpose processors, such as graphics processing units (GPUs) for general purpose computing and other types of hardware accelerators, have been developed for accelerated processing of specific types of workloads. The processing capabilities of GPU devices and other types of hardware accelerators are currently being utilized in various applications to accelerate the processing of highly-parallelized computational workloads in various technical fields. In particular, general-purpose computing on GPU (GPGPU) is utilized for high-throughput, accelerated processing of compute kernels for workloads (e.g., vector-based computations, matrix-based computations, etc.) that exhibit data-parallelism. For example, GPUs are used to accelerate data processing in high-performance computing (HPC) and embedded computing systems, for various applications such as financial modeling, scientific research, machine learning (ML), deep learning (DL), data mining, video data transcoding, image analysis, image recognition, virus pattern matching, augmented reality, encryption/decryption, weather forecasting, big data analytics and comparisons, and other applications with computational workloads that have an inherently parallel nature.

A distributed computing environment which comprises a large scale of shared computing resources over a cluster of computing nodes is typically utilized to support emerging applications such as big data analytics and DL learning applications. Indeed, DL applications, for example, require the collection, storage, and processing of a significantly large amount of data, wherein the data includes training data to build and optimize DL models, as well as model parameters of the deep learning models which are utilized for inference processing. Implementing an efficient distributed computing environment for these types of applications is not trivial as the intensive computational workloads, and the massive volume of data that must be stored, streamed, prefetched, and coordinated between the shared computing resources of the distributed computing platform presents a significant challenge and practical limit on system performance and scalability.

Furthermore, in an HPC domain, long running, heavy computing intensive tasks (e.g., DL training process) dominate the workloads of GPU resources, and such intensive GPU processing tasks can last for hours, days or even weeks to execute certain tasks (e.g., train DL models) and deliver results. It is common for a GPU server to experience some error at some point during the execution of a relatively long GPU processing task, or otherwise have the GPU processing task preempted at some point in the execution to execute a higher priority task. Such error can range from software error, memory failure, power failure, or even natural disasters. Recovering a GPU computing result by re-executing the task from the beginning to the break point is generally not a good solution due to the long running time of the GPU processing task and the heavy computing power requirement. Therefore, checkpointing the calculation result by saving a current program state in non-volatile storage is a more optimal solution to make the system robust and failure tolerant.

Checkpointing in a cloud or distributed environment faces many challenges. Such challenges include, but are not limited to, long synchronization overhead, large data movement over a communications network, significant use of system resources such as system memory and storage bandwidth, etc. For example, checkpoint images of DL models can be 500 MB or greater, which requires the use of a significant amount of bandwidth and networking resources to perform memory copy operations to transfer checkpoint images from GPU device memory to host memory (e.g., system memory) for checkpoint operations. In addition, in conventional systems, DL training is temporarily suspended during a DL model checkpoint operation to maintain a consistent state of the intermediate DL model. The longer a checkpoint operation takes, the greater the impact on the DL training process. Further, a large checkpoint image of a DL model can consume a large amount of memory and disk space.

SUMMARY

Illustrative embodiments of the invention include methods for optimizing checkpoint operations in high-performance computing applications such as DL model training applications. For example, one embodiment includes a method which comprises executing a distributed DL model training process to train a DL model using a plurality of accelerator devices residing on one or more server nodes of a computing system, and performing a checkpoint operation to generate and store a checkpoint image of an intermediate DL model which is generated during the distributed DL model training process and stored in a memory of a given accelerator device. The checkpoint operation comprises: compressing the checkpoint image of the intermediate DL model stored in the memory of the given accelerator device to generate a compressed checkpoint image in the memory of the given accelerator device; scheduling a time to perform a memory copy operation to transfer a copy of the compressed checkpoint image from the memory of the given accelerator device to a host system memory, wherein the scheduling is performed based on a bandwidth usage of a communication link of the computing system, which is to be utilized to transfer the compressed checkpoint image to perform the memory copy operation; and performing the memory copy operation at the scheduled time.

Other embodiments of the invention include, without limitation, systems and articles of manufacture comprising processor-readable storage media, which are configured to optimize checkpoint operations in high-performance computing applications such as DL model training applications.

DETAILED DESCRIPTION

Figure 1:
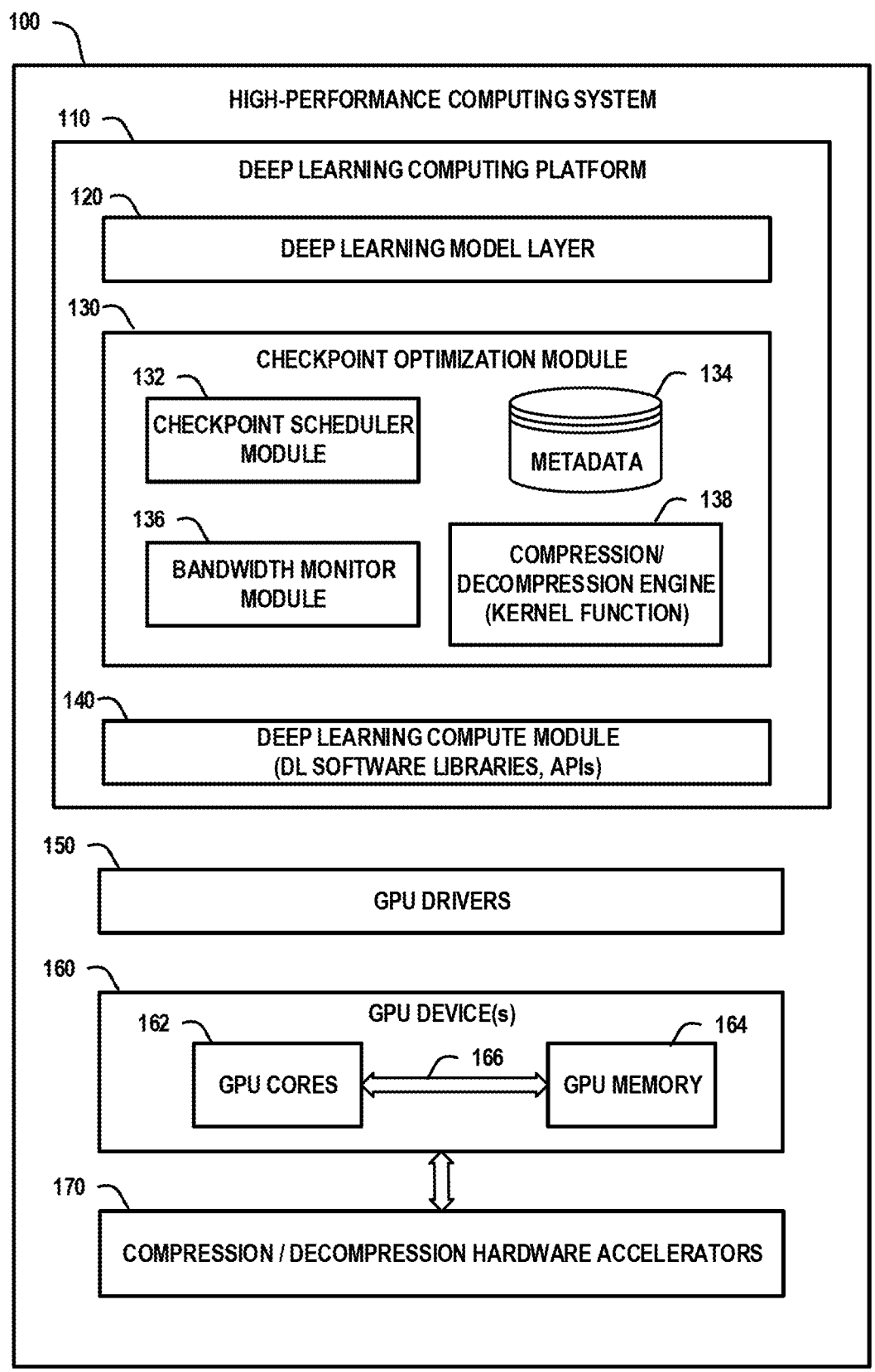
FIG. 1 is a high-level schematic illustration of a computing system which is configured to optimize checkpoint operations for a distributed DL training application, according to an embodiment of the invention.

Illustrative embodiments of the invention will now be explained in further detail with regard to systems and methods for optimizing checkpoint operations in high-performance computing applications such as deep learning computing. As explained in further detail below, embodiments of the invention provide systems and methods for optimizing checkpoint operations where a checkpoint copy of an application state (e.g., intermediate DL model) of a HPC task running on a plurality of hardware accelerator devices (e.g., GPU devices) is copied to host system memory through a host-device (e.g., CPU-GPU) coordinated checkpoint protocol which is configured to minimize a negative impact on network communication and computing performance when performing checkpoint function. A host-device coordinated (and adaptive) data compression scheme is utilized to compress a checkpoint image of an intermediate DL model to significantly reduce a size of the checkpoint image for storage in memory and/or disk. In addition, a bandwidth-aware scheduling protocol is implemented to perform device-to-host memory copy operations in which a copy of a compressed checkpoint image of an intermediate DL model is transfer transferred and stored from device memory (e.g., GPU memory) to host memory (DRAM) at optimal times to minimize bus/network communication load and minimize impact on DL computing tasks.

While the exemplary checkpoint optimization functions discussed herein can be implemented for various HPC applications, for illustrative purposes, the exemplary methods will be discussed in the context of performing DL model training for Deep Neural Network (DNN) applications in a distributed computing environment, which requires a significant use of computing resources (e.g., processor, memory, storage, and networking resources), and the communication of large amounts of data over internal system busses and/or inter-node network communication links. A DL model is typically utilized in machine learning applications for pattern recognition, image processing, and other artificial intelligence applications. A DL application can utilize a DNN, wherein a DNN comprises a feedforward artificial neural network with multiple hidden layers. A convolutional neural network (CNN) is one class of DNN which is commonly applied for analyzing images. A CNN comprises a sequence of functional layers including an input layer, an output layer, and a plurality of hidden layers between the input and output layers. The functional layers include, but are not limited to, convolutional layers, pooling layers, fully connected layers, normalization layers, etc.

A convolutional layer applies a "convolution operation" to an input dataset, and passes the processing results to the next layer in the network. As is known in the art, a convolutional layer applies filters (alternatively referred to as neurons or kernels) across all regions of an input dataset, wherein each filter is spatially smaller than the full volume of the input data set. The filters of a convolutional layer each comprise a set of learnable parameters (or weights), which are learned using a DL model training process. A convolutional layer utilizes a set of filters to perform a forward pass through an input dataset, wherein each filter slides (or convolves) across the width and height of the input volume and computes dot products between the entries of the filter and the input data at any position (i.e., receptive field). In essence, the convolution layer computes an output of neurons which are connected to corresponding local regions in the input data.

FIG. 1 is a high-level schematic illustration of a computing system which is configured to optimize checkpoint operations for a distributed DL training application, according to an embodiment of the invention. In particular, FIG. 1 schematically illustrates a HPC system 100 which comprises a deep learning computing platform 110. The deep learning computing platform 110 comprises a plurality of application layers including a deep learning model 120, a checkpoint optimization module 130, and a deep learning compute module 140. The checkpoint optimization module 130 comprises a checkpoint scheduler module 132, a datastore of metadata 134, a bandwidth monitor module 136, and a compression/decompression engine 138. The HPC system 100 further comprises GPU drivers 150, one or more GPU devices 160, and optional compression/decompression hardware accelerators 170. The GPU device(s) 160 each comprise a plurality of GPU processing cores 162, GPU memory 164, and an internal bus 166, wherein the GPU cores 162 access the GPU memory 164 over the internal bus 166.

In the example embodiment of FIG. 1, the checkpoint optimization module 130 comprises a middleware-level framework which resides between the deep learning model layer 120 and the deep learning compute module 140. In one embodiment, the checkpoint optimization module 130 is configured to provide support for checkpoint services for distributed DL training operations performed by the deep learning computing platform 110. The checkpoint optimization module 130 implements methods to support checkpoint compression and handling functions in a manner which is transparent to the deep learning computing platform 110.

The deep learning computing platform 110 comprises a software platform to support deep learning applications such as model training and inference processing (or classification). The deep learning computing platform 110 can be implemented using known commercially available machine learning platforms such as Tensorflow, Microsoft Cognitive Toolkit (CNTK), Apache MXNet, Caffe, and other open-source deep learning frameworks that are configured to train, and deploy deep neural networks for HPC applications. The deep learning model layer 120 can implement one or more different types of models such as CNN models, recurrent neural network (RNN) models, region-based CNN (R-CNN)

models, faster R-CNN models, mask R-CNN models, and other state-of-the-art DL models that are commonly utilized for high-performance DL computing applications.

The deep learning compute module 140 comprises software libraries and application programming interfaces (APIs) of one or more deep learning frameworks (e.g., Tensorflow NTK, MXNet, etc.), which include pre-written code, classes, procedures, scripts, configuration data, etc., which can be called or otherwise utilized by the GPU devices 160 by executing machine learning tasks and related functions, or otherwise access or communicate with GPU devices 160 through the GPU drivers 150. The types of software libraries and APIs of the deep learning compute module 140 will vary depending on the particular framework of the deep learning computing platform 110. In one embodiment, the deep learning compute module 140 implements commercially available library and/or API platforms such CUDA®, which is a parallel computing platform and application programming interface created by NVIDIA. The CUDA API enables the use of CUDA-enabled GPUs for general purpose processing. The CUDA platform is a software layer that allows direct access to the instruction set and parallel computational elements of a GPU, for executing compute kernels.

In particular, the NVIDIA CUDA API comprises the CUDA® Deep Neural Network library (cuDNN) library and the NVIDIA cuBLAS library. As is known in the art, cuDNN is a GPU-accelerated library of primitives for deep neural networks, which provides implementations for standard routines such as forward and backward propagation operations in DL models comprising convolution layers, pooling layers, normalization layers, activation layers, etc. The cuDNN library is utilized by various deep learning frameworks, such as Tensorflow, CNTK, MXNet, Keras, and Caffe, to support high-performance GPU acceleration. The NVIDIA cuBLAS library is a fast GPU-accelerated implementation of the standard basic linear algebra subroutines (BLAS). The cuBLAS APIs allow an application to be accelerated by deploying compute-intensive operations to a single GPU or distributing work across multi-GPU configurations. Keras is a high-level neural network API, written in Python and capable of running on top of TensorFlow and CNTK. In one embodiment, the GPU drivers 130 are implemented using cuDNN.

In general, the deep learning frameworks supported by the deep learning compute module 140 implement methods for training DL models (e.g., DNN models such as CNN) to support machine learning and pattern recognition applications. Despite their different topologies at the network-level, different types of DNNs are essentially built from the same pool of functional layers, including fully connected layers, convolutional layers, pooling layers, etc., wherein different configurations, combinations, sequences, etc., of the functional layers are generated to construct different DNNs for different learning and inference tasks. Depending on the given deep learning framework (e.g., Tensorflow, MXnet, Kerras, etc.) the DL model comprises a plurality of functional layers that are sequentially processed in a predefined order (e.g., conv1, conv2, pooling, fully connected, etc.), wherein the functional layers are defined by a developer using the APIs from the deep learning compute module 140 of the DL framework. The functional layers of a DL model invoke the GPU optimized libraries (e.g., NVIDIA cuDNN or cuBLAS), and run as GPU kernel functions in the GPU cores 162 of the GPU devices 160.

In some embodiments, the DL frameworks supported by the deep learning compute module 140 implement a stochastic gradient descent (SGD) process to train deep neural network models. With a SGD training process, an error gradient with respect to each model parameter of a given DL model is calculated using multiple iterations of a backpropagation process. A backpropagation comprises a sequence of three cycles including (i) a forward process, (ii) a backward process, and (iii) a weight update process, wherein the backpropagation process is repeated for many iterations until a convergence criterion is met. Each iteration of the backpropagation process is performed on a mini-batch of data, wherein a mini-batch of data comprises a subset (or portion) of a total dataset of model training data. For each iteration, a mini-batch of data (e.g., M training samples) is read from disk to host memory. The mini-batch of data is transferred from host (CPU) memory to device memory (e.g., GPU memory 164). The GPU kernel functions are instantiated and launched to execute the backpropagation process.

For example, a feed forward operation (forward process) is performed to process the mini-batch of data layer by layer of the given DL model. Once the information reaches the final output layer of the DL model, an error signal is calculated and back propagated through the DL network model using a backward process, which involves minimizing an objective function by calculating error gradients with respect to model parameters (e.g., weights) and input data. A model parameter (e.g., weights) update process is then performed to update the DL model parameters based on the computed error gradients. Another iteration of the backpropagation process is then repeated using another mini-batch of data that is accessed from host memory. The SGD process is performed with subsets (mini-batches) of the training data, taking multiple iterations to progress through the entire training dataset.

A distributed SGD DL training process can be implemented by the deep learning computing platform 110 in the HPC system 100 using a data-parallel programming model in which the SGD training process is executed in parallel on a plurality of GPU devices 160 that are distributed over one or more compute nodes of the HPC system 100. While various distributed system configurations can be implemented to perform a distributed DL model training process (e.g., parameter server-based systems (FIG. 2), decentralized accelerator device cluster system (FIGS. 3 and 4), etc.), a DL model can be trained using a distributed, data-parallel SGD process as follows.

In data parallel training, for each iteration of a backpropagation process, a mini-batch of data samples is partitioned and evenly distributed to a plurality of GPU devices (workers), which can reside on the same or different server machines. With data parallelism, each GPU device has access to a complete copy of a given deep learning model, but for each iteration, each GPU device is only assigned a subset of the data samples of a current mini-batch for the given iteration. For each iteration, each GPU launches kernel functions to perform a forward propagation of the DL network model using its respective subset of data samples, followed by an error backpropagation process to compute the gradient of the loss with respect to the DL model parameters. The GPU devices perform the forward and backward propagation operations on their respective subsets of data in parallel. The gradient parameters computed by all GPU devices for the given iteration are then aggregated/synchronized (e.g. averaged) and the averaged gradient parameters are pushed to each GPU device so that each GPU device can perform a parameter update process using the averaged gradient parameters to update the model parameters of the DL network model.

During a DL model training process, the checkpoint optimization module 130 implements methods that are configured to schedule and coordinate the generation and compression of checkpoint images of current DL model states, and transferring copies of the checkpoint images from device-to-host (e.g., from GPU to CPU) memory, to reduce the impact of performing checkpoint operations on deep learning training tasks being executed by one or more GPUs and/or other types of programmable hardware accelerator devices (e.g., TPUs). The checkpoint optimization module 130 is configured to intelligently and efficiently optimize data flow and communication between processor and other devices on intra-node and/or inter-node communication links when performing checkpoint memory copy operations, e.g., between local processor devices (e.g., GPU↔GPU, GPU↔CPU) and between local processor and memory devices (e.g., GPU↔NVRAM) which reside on a single physical worker server node (intra-node data communication), or between local and remote processor/memory resources (inter-node data communication) residing on different physical worker server nodes.

The checkpoint scheduler module 132 implements methods that are configured to schedule and coordinate various functions to support optimized checkpointing of intermediate DL models that are generated during a DL training process executed by a plurality of the GPU devices 160 of the HPC system 100. For example, in one embodiment, the checkpoint scheduler module 132 is configured to select/schedule a given accelerator device (e.g., GPU device 160, a dedicated compression accelerator 170, etc.) of the HPC system 100 to execute a data compression task to compress a checkpoint image of an intermediate DL model. For example, the checkpoint scheduler module 132 is configured to schedule the execution of a compression engine kernel function on different GPU devices 160 of the HPC system 100 at different times such as in round-robin fashion (assuming each GPU device maintains a full DL model), in which case the GPU devices that perform the DL training task are also utilized to execute data compression kernel functions to compresses a checkpoint image of an intermediate DL model.

In addition, the checkpoint scheduler module 132 is configured to control the scheduling and execution of memory copy operations to transfer a compressed checkpoint image from device-to-host (e.g., GPU to CPU), and to asynchronously transfer an in-memory copy of a checkpoint image to a target directory in secondary storage (e.g., hard disk). For example, the checkpoint scheduler module 132 is configured to utilize bandwidth usage information captured by the bandwidth monitor module 136 to determine optimal times in which memory copy operations can be performed to transfer a compressed checkpoint image of a DL model from device-to-host memory, and coping in-memory copy of the compressed checkpoint image from host-to-disk over intra-node and/or inter-node communication links, while minimizing data communication bottleneck on the bus/network communication networks, and minimizing the impact on the pending DL training task.

The bandwidth monitor module 136 implements methods that are configured to monitor the bandwidth usage of each intra-node and/or inter-node communication bus/network that is used to transfer data between host CPU devices and accelerator devices (e.g., GPU devices) for a given system configuration of the HPC system 100 in which a DL training task is being performed. The HPC system 100 may comprise reporting agents (software or firmware modules) which run on server nodes of the HPC system 100 and/or which run on switch devices within intra-node and inter-node bus/networking infrastructure of the HPC system 100, to collect and report current (real-time) bandwidth usage information to the centralized bandwidth monitor module 136. A reporting agent executing on a given server node or switch can collect and periodically report bus or networking bandwidth usage information in terms of actual bandwidth, Mbits/sec, or as a percent of a maximum bandwidth of a given communication link.

In one embodiment, the reporting agents are configured to regularly monitor and report the bandwidth usage of the intra-node and/or inter-node bus and/or networking communication links between host (e.g., CPU) and device (e.g., GPU) at periodic intervals. The reporting period is a configurable parameter which can be selected, as desired, to obtain real-time or near real-time bandwidth usage information. For example, the reporting period for current bandwidth usage can be set to 1 s, 2 s, 3 s, 4 s, 5 s, etc. In this manner, the checkpoint scheduler module 132 can monitor, in real-time, the bandwidth of device-to-host and host-to-device data communications over intra-node and/or inter-node communication links during execution of a DL model training process, and schedule optimal times (e.g., low bandwidth usage) for transferring a checkpoint image of current DL model state from host-to-device in a manner which minimizes the impact on the DL model training process. In this regard, the checkpoint scheduler module 132 and bandwidth monitor module 136 collectively implement a "bandwidth-aware" scheduling system which is configured to schedule memory copy operations for copying in-memory checkpoint images from device-to-host, as well as asynchronous copy from host memory to disk, to minimize the impact of checkpoint image copy operations during a pending DL training process.

The datastore of metadata 134 stores various types of metadata that are generated and/or utilized by the checkpoint optimization module 130 to perform the various functions discussed herein. For example, the metadata 134 comprises "classification accuracy" information regarding an accuracy measure of a last stored checkpoint image of an intermediate DL model. During a DL training operation, when a new intermediate DL model is generated at the completion of a given iteration of the backpropagation process for DL training, a classification accuracy of the new intermediate DL model can be determined and compared against the stored classification accuracy information of the last stored checkpoint image to determine if a new checkpoint image should be stored. For example, no checkpoint image will be generated for a new intermediate DL model with a classification accuracy that is the same or less than the classification accuracy of the intermediate DL model corresponding to the last stored checkpoint image. The metadata 134 can also include information regarding a pending device-to-host copy operation for a given checkpoint image, which is pending in the GPU memory of a given GPU device.

The data compression/decompression engine 138 implements a data compression method that is configured to compress a checkpoint image of an intermediate DL model in a fast and efficient manner. In one embodiment, a checkpoint image of an intermediate DL model is compressed prior to performing a device-to-host memory copy operation so that a compressed checkpoint image of the intermediate DL model (with reduced size) is transmitted from device-to-host for a memory copy operation. The data compression/decompression engine 136 further implements a data decompression method that is configured to decompress a compressed checkpoint image of an intermediate DL model, which may be subsequently accessed and utilized under certain circumstances. An intermediate DL model that is generated at a given point of a DL model training process comprises information regarding the structure and sequence of the intermediate DL model layers and the associated layer parameters (e.g., weights, gradients, bias, etc.) feature maps, etc.). The DL model information is compression friendly, and the intermediate DL models can be sparse models. As such, the intermediate DL model that is generated during a DL training process can be efficiently compressed at a compression ratio of 10× or greater, using suitable data compression protocols. Thus, the use of data compression can provide a significant reduction in the size of an intermediate DL model, and thus, a significant reduction in the size of a compressed checkpoint image of the intermediate DL model which is to be transmitted from device-to-host and copied into the host memory.

In one embodiment of the invention, the data compression/decompression engine of the checkpoint optimization module 130 comprises kernel functions that can be executed in a host processor (e.g., CPU) or hardware accelerator device (e.g., GPU device). The data compression/decompression kernel functions of the data compression/decompression engine 136 can be implemented using any suitable methods for lossless data compression and decompression, which can be efficiently executed by GPU devices, for example, with relatively low GPU utilization. For example, the compression/decompression kernel functions can be defined using a GPU programming language such as CUDA, or using data compression and decompression routines supported by commercially available compression/decompression libraries for GPU and other hardware accelerators. For example, compression algorithms that support lightweight quantization are sufficient for compressing DL models as most weight/bias values are 0). Other more complex compression methods (e.g., three stage compression method that includes pruning, trained quantization and Huffman coding), which provide compression ratios of 35× or greater, can be utilized without any impact on final prediction accuracy.

In another embodiment, the compression and decompression operations can be performed using the optional data compression/decompression hardware accelerators 170. In the example embodiment of FIG. 1, the data compression/decompression hardware accelerators 170 are hardware elements that can be either integrated within the GPU devices 160, or otherwise implemented as separate hardware accelerators which are accessible by the GPU devices 160. For example, the data compression/decompression hardware accelerators 170 can be integrated with memory controllers of the GPU devices 160, or implemented using hardware processing elements that are integrated within memory within the GPU devices 160 (which is known as "processing in memory" (PIM)). The use of hardware-based data compression and decompression acceleration increases the data processing efficiency by, e.g., reducing the time needed for data compression/decompression (as compared to executing data compression and decompression kernels in the GPU cores 162 of the GPU devices 160), and freeing up more GPU resources for executing DL training workloads.

While FIG. 1 depicts a high-level configuration of an HPC system 100 that is configured to execute deep learning computing and training operations, and provide optimized checkpoint control functionality to generate and store checkpoint images of intermediate DL models generated during a training process, it is to be understood that the HPC system 100 can be implemented using various types of distributed computing configurations to perform DL model training. For example, the HPC system 100 can be implemented using a parameter server (PS) framework for distributed and parallelized training of a deep neural network model using a cluster of accelerator device (e.g., GPU device). A parameter server framework provides a communication synchronization protocol in which multiple accelerator devices (e.g., GPU worker nodes) involved in a parallel distributed DL training process have shared access to a recent set of model parameters of a given DL model being trained.

Figure 2:
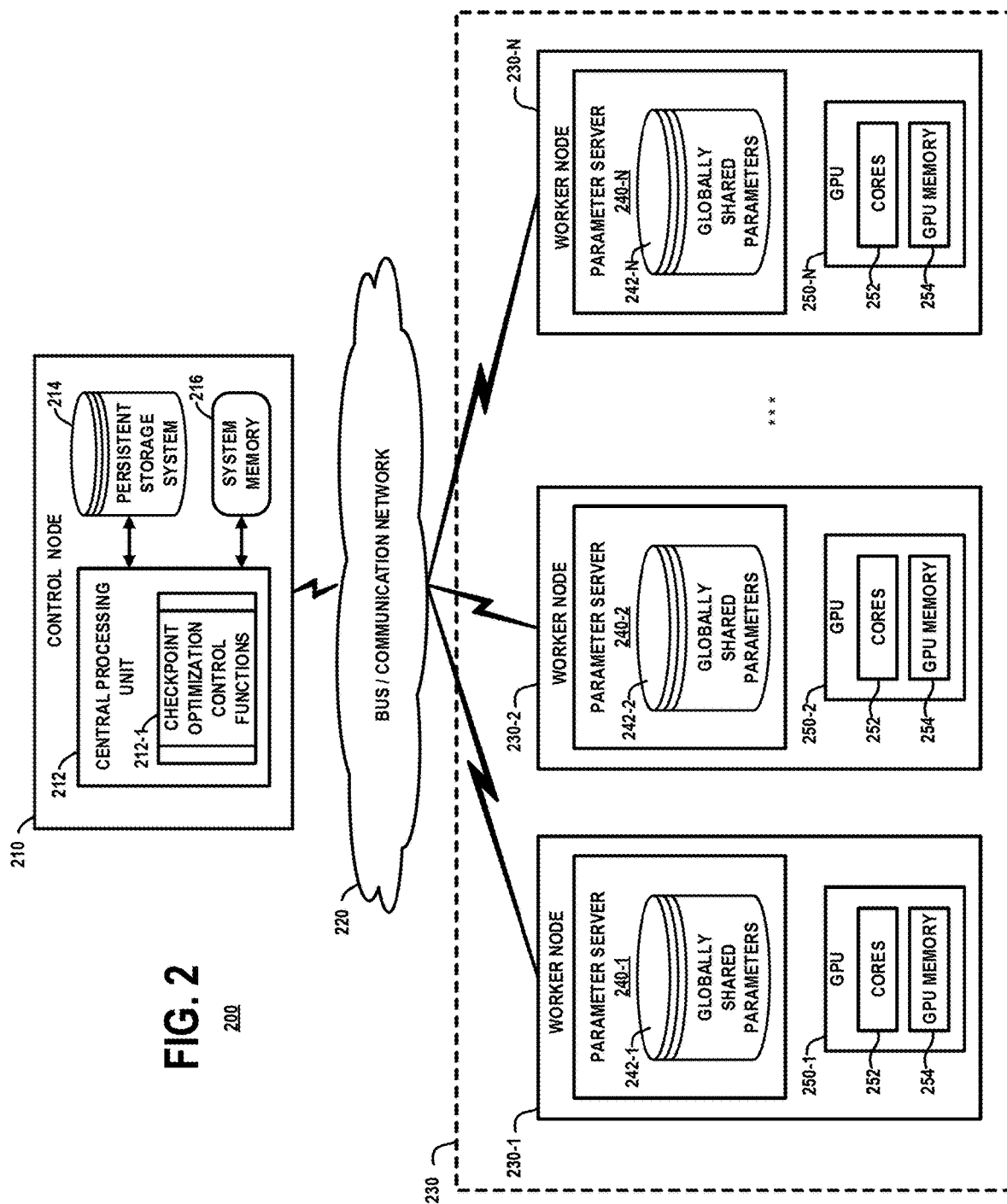
FIG. 2 schematically illustrates an exemplary implementation of the system of FIG. 1 to optimize checkpoint operations for a distributed DL training application using a parameter server framework to exchange model parameters between a cluster of GPU devices, according to an embodiment of the invention.

For example, FIG. 2 schematically illustrates an exemplary implementation of the system of FIG. 1 to optimize checkpoint operations for a distributed DL training application using a parameter server framework to exchange model parameters between a cluster of GPU devices, according to an embodiment of the invention. In particular, FIG. 2 schematically illustrates a distributed computing system 200 comprising a control node 210, a bus/communication network 220, and a compute cluster 230 comprising a plurality of worker nodes 230-1, 230-2, . . . , 230-N (collectively, worker nodes 230). The control node 210 comprises at least one central processing unit 212, a persistent storage system 214 (e.g., HDDs), and system memory 216 (e.g., DRAM). The central processing unit 212 executes checkpoint optimization control functions 212-1 associated with the checkpoint optimization module 130 (FIG. 1). The worker nodes 230-1, 230-2, . . . , 230-N comprise respective parameter servers 240-1, 240-2, . . . , 240-N (collectively, parameter servers 240) which manage a respective set of globally shared model parameters 242-1, 242-2, . . . , 242-N. The worker nodes 230-1, 230-2, . . . , 230-N comprise respective GPU devices 250-1, 250-2, . . . , 250-N (collectively GPU devices 250) which have processing cores 252 and GPU memory 254.

The control node 210 and the worker nodes 230 of the distributed system 200 can be implemented as bare metal processes, virtual machines, and/or containers, etc. In some embodiments, the control node 210 and the worker nodes 230 of the distributed system 200 of FIG. 2 are different nodes which execute on the same physical node (e.g., server node). In other embodiments, the control node 210 and the worker nodes 230 of the distributed system 200 are different nodes which are distributed and executed across two or more different physical nodes (e.g., different server nodes). In this regard, the bus/communication network 220 comprises backbone networking infrastructure and communication protocols to implement one or more of various types of intra-node and/or inter-node connection topologies and communication protocols that are utilized to physically connect, and enable communication between, the hardware processor resources of the control node 210 and the worker nodes 230.

For example, the intra-node connection topologies within a given physical server node can be implemented using various communication protocols such as a Remote Direct Memory Access (RDMA) protocols, an InfiniBand (TB) protocol, a Peripheral Component Interconnect Express (PCIe) protocol, a NVIDIA® NVLink™ protocol, NVIDIA GPUDirect, and other point-to-point serial interconnect protocols that enable, e.g., CPU-GPU and GPU-GPU communication. Furthermore, a given server node may implement the QuickPath Interconnect (QPI) protocol, which is a point-to-point processor interconnect framework that enables a Non-Uniform Memory Access (NUMA) architecture for a cluster of processors, etc. The inter-node connection topologies between different physical server nodes and the types of inter-node communication protocols that are used by the server nodes for network communication can include, but are not limited to, communication protocols such as TCP/IP, Gigabit Ethernet (GbE) (e.g., 10/25/40/100 GbE), RDMA, IB, Message Passing Interface (MPI), etc.

The distributed computing system 200 implements a centralized, parameter server framework to execute a parallel DL training across the worker nodes 230 using a data parallelism programming model. With a data parallel DL model training process, the CPU 212 of the control node 210 will access mini-batches of a training dataset from the persistent storage 214, and store the mini-batches of data in the system memory 216. For a given iteration of a DL training process, a given mini-batch of data (M data samples) is accessed from system memory 216 and evenly distributed among the different worker nodes 230-1, 230-2, . . . , 230-N, such that MN data samples of the given mini-batch of data are stored in the GPU memory 254 of each GPU device 250-1, 250-2, . . . , 250-N.

In addition, with the data parallel DL model training process, each worker node 230-1, 230-2, . . . , 230-N has access to a complete, updated copy of a given DL model being trained, which is maintained in the data store of globally shared model parameters 242-1, 242-2, . . . , 242-N maintained by the respective parameter servers 240-1, 240-2, . . . , 240-N. The globally shared parameters represent the model parameters (e.g., dense/sparse vectors, weights, etc.) that are computed by worker nodes 230 during a training phase, and aggregated/combined/synchronized by the parameter servers 240. In particular, for each worker node 230-1, 230-2, . . . , 230-N, the respective GPU devices 250-1, 250-2, . . . , 250-N will execute DL model training kernel functions using the GPU cores 252 to process a local subset of a given mini-batch of training data being processed for the given iteration to compute local model parameters (e.g., gradients).

The GPU devices 250-1, 250-2, . . . , 250-N will communicate with the respective parameter servers 240-1, 240-2, . . . , 240-N to locally update the globally shared parameters 242-1, 242-2, . . . , 242-N, wherein processing results (e.g., gradients) are synchronized (e.g., averaged) after each processing iteration of a mini-batch dataset. For example, in the parameter server framework, each worker GPU device 250-1, 250-2, . . . , 250-N will compute a gradient on its subset of the given mini-batch of training data, and then each worker GPU device 250-1, 250-2, . . . , 250-N sends its computed gradient to the respective parameter server 242-1, 242-2, . . . , 242-N, which takes the average of all the gradients, and sends the computed average back to the worker GPU device 250-1, 250-2, . . . , 250-N.

While a single parameter server can be implemented to store and maintain an entire DL model in a single node, FIG. 2 illustrates an example embodiment of the distributed computing system 200 in which the parameter server logic comprises a plurality of parameter servers 240-1, 240-2, . . . , 240-N distributed over the worker nodes 230-1, 230-2, . . . , 230-N. The parameter servers 240-1, 240-2, . . . , 240-N of the worker nodes 230 can be executed by CPU devices or by the respective GPU device 250-1, 250-2, . . . , 250-N. With the distributed parameter server framework of FIG. 2, the parameter servers 240-1, 240-2, . . . , 240-N receive local parameters computed by the respective GPU device 250-1, 250-2, . . . , 250-N for a given DL training iteration, and then communicate (inter-PS communication) with each other to aggregate the local parameters (e.g. compute global average gradients) and update the DL model, and then push the updated DL model to each GPU device 250-1, 250-2, . . . , 250-N. In this manner, the model parameters are managed and synchronized by a plurality of cooperating parameter server nodes that collectively update the globally shared model parameters 242-1, 242-2, . . . , 242-N, which are shared across the worker nodes 230-1, 230-2, . . . , 230-N. With this framework, all state that is shared among the worker nodes 230 (i.e. the DL model parameters being learned) is maintained and synchronized by the parameter servers 240-1, 240-2, . . . , 240-N.

Figure 5:
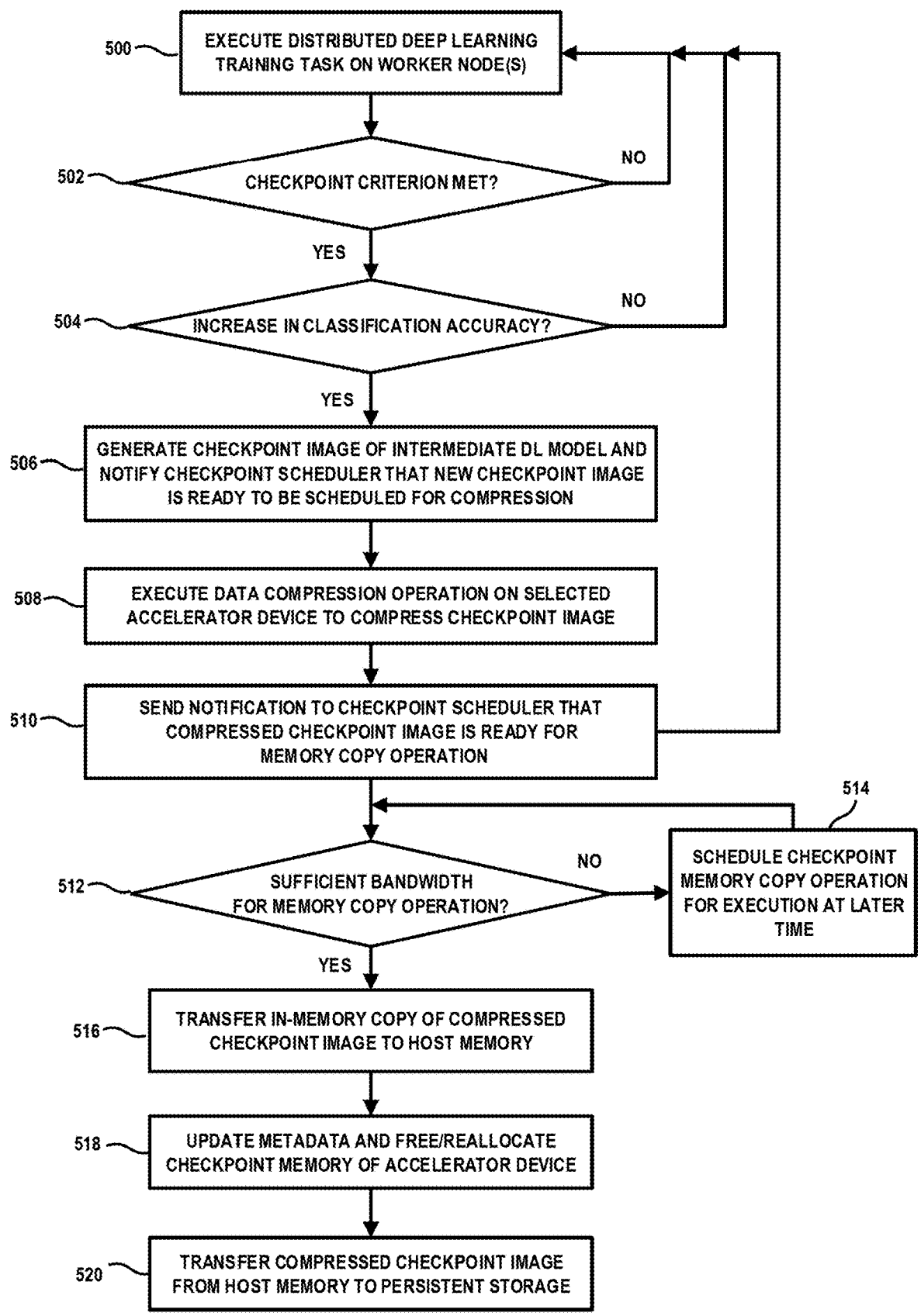
FIG. 5 is a flow diagram of a method for performing checkpoint operations for a distributed DL training application, according to an embodiment of the invention.

During execution of a DL training process by the distributed system 200, the CPU 212 of the control node 210 will execute program instructions of the checkpoint optimization module 130 (FIG. 1) to perform various checkpoint optimization control functions 212-1 to generate checkpoint images of intermediate DL model states, compress the checkpoint images, and stage the compressed checkpoint images in system memory 216 and or persistent store 214 using a process flow as described in further detail below with reference to FIG. 5. For example, the checkpoint optimization control functions 212-1 comprise checkpoint image scheduling control functions which are configured to select a given one of the GPU devices 250-1, 250-2, . . . , 250-N to generate and compress a checkpoint image of an intermediate DL model stored in its GPU memory 254. In one embodiment, the selected GPU device will execute a compression kernel function using its GPU cores 252 to compress a checkpoint image of an intermediate DL model state in the GPU memory 254. The checkpoint image scheduling control functions implement a bandwidth-aware scheduling protocol to schedule a device-to-host memory copy operation for transferring a copy of the compressed checkpoint image of the intermediate DL model from the GPU memory 254 to the system memory 216 over the bus-communication network 220 at an optimal time when bandwidth-usage of the communication link(s) between the selected GPU device and the CPU 212 is deemed to be relatively low (as per one or more predetermined criteria) and would minimize adverse impact on the DL training process.

Figure 3:
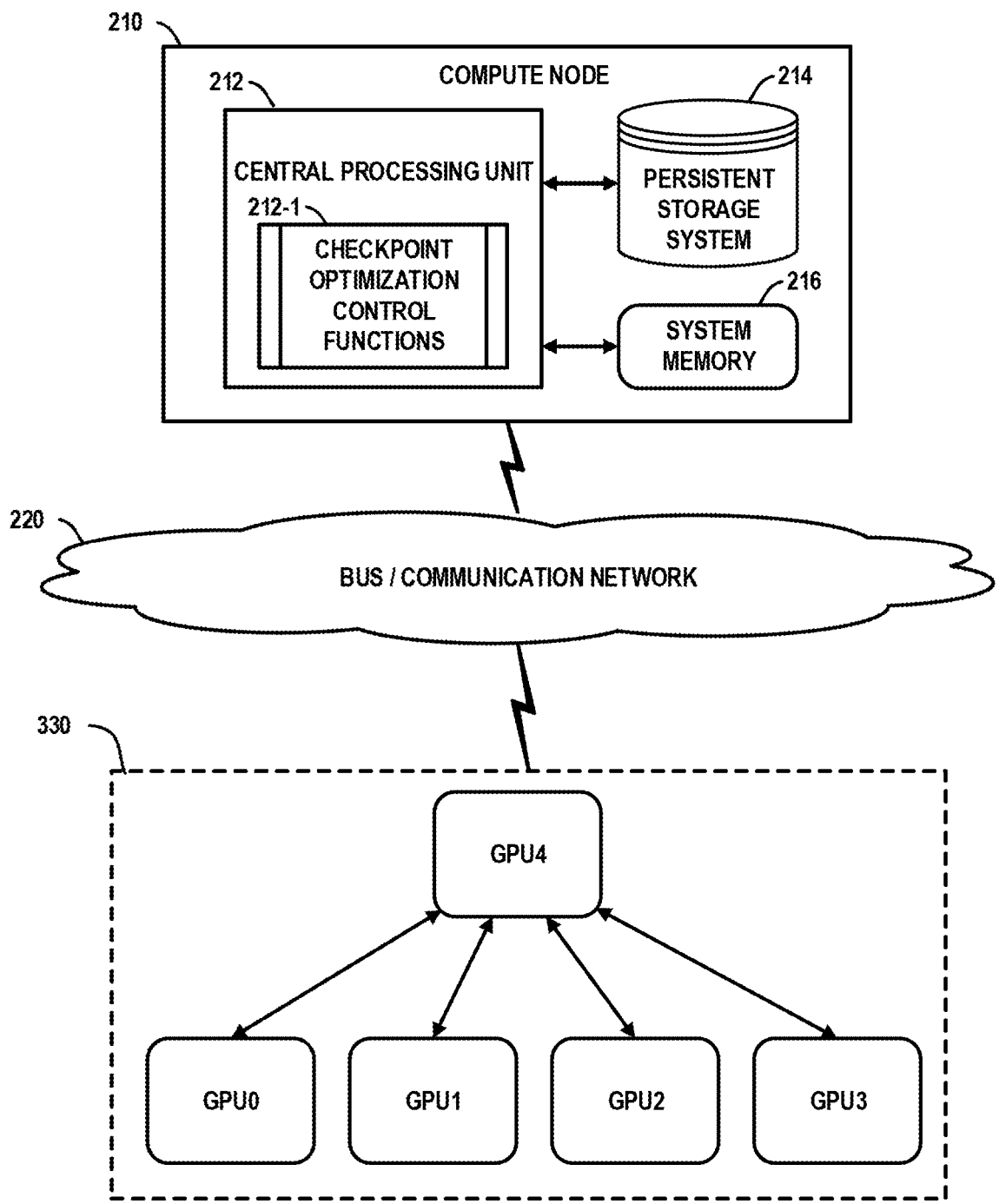
FIG. 3 schematically illustrates an exemplary implementation of the system of FIG. 1 to optimize checkpoint operations for a distributed DL training application using a decentralized cluster of GPU devices that exchange model parameters using an AllReduce protocol, according to an embodiment of the invention.

While FIG. 2 illustrates a distributed computing system for DL model training using a centralized parameter server framework, the HPC system 100 system of FIG. 1 can be implemented using a decentralized distributed computing framework in which DL model parameters are exchanged and synchronized between a decentralized cluster of GPU devices which perform all-reduce and/or all-gather operations. For example, FIG. 3 schematically illustrates an exemplary implementation of the system of FIG. 1 to optimize checkpoint operations for a distributed DL training application using a decentralized cluster of GPU devices that exchange model parameters using an AllReduce protocol, according to an embodiment of the invention. In particular, FIG. 3 schematically illustrates a distributed computing system 300 comprising a control node 210, a bus/communication network 220, and a compute cluster 330 of GPU devices GPU0, GPU1, GPU2, GPU3 and GPU4. While five (5) GPU devices are shown in FIG. 3 for illustrative purposes, the GPU cluster 330 can have more or less than 5 GPU devices. The control node 210 and bus/communication network 220 are the same or similar to that show and discussed above in FIG. 2.

The cluster of GPU devices 330 may be implemented on a single physical GPU server node, or distributed over two or more GPU server nodes. In terms of computation operations, an "all-reduce" operation is equivalent to a reduction operation which reduces the results to one process, followed by a broadcast operation to distribute the results to all processes. With regard to distributed computing using the cluster 330 of GPU devices GPU0~GPU4, an all-reduce operation combines the processing results from all GPU devices, and distributes the combined processing results to all GPU devices GPU0~GPU4. In particular, during a SGD DL model training process, a given mini-batch of data (M data samples) is accessed from system memory 216 and evenly distributed among the different GPU devices GPU0~GPU4 and stored in the GPU memory of such GPU devices. For a given iteration, each GPU device GPU0~GPU4 utilizes its subset of training data to execute a forward propagation process on the DL model, followed by error backpropagation to compute a gradient of the loss with respect to the DL network model parameters. In this manner, for the given iteration, each GPU device GPU0~GPU4 computes a gradient on its subset of the mini-batch of training data.

Further, in the example embodiment of FIG. 3, each GPU device GPU0, GPU1, GPU2, and GPU3 sends the computed parameters (gradients) to the GPU device GPU4, which is designed to perform an all-reduce operation. In particular, the GPU device GPU4 determines an average of all the gradients computed by the GPU devices GPU0, GPU1, GPU2, GPU3, and GPU4 for the given iteration, and then pushes the computed gradient average to the GPU devices GPU0, GPU1, GPU2, and GPU3 to perform a weight update process using the computed gradient average. In this framework, one GPU device (e.g., GPU4) in the GPU cluster 330 is selected to perform all-gather operations to aggregate the computed gradients from all of the GPU devices in the cluster 330, and perform an all-reduce operation by computing an average of the gradients and sending the averaged gradients to the GPU devices so that each GPU device can perform a weight update process. At the end of each iteration, each GPU device GPU0~GPU4 has a complete copy of the most recent (intermediate) DL model.

As with the example embodiment of FIG. 2 as discussed above, during execution of a DL training process by the distributed system 300, the CPU 212 of the control node 210 will execute program instructions of the checkpoint optimization module 130 (FIG. 1) to perform various checkpoint optimization control functions 212-1 to generate checkpoint images of intermediate DL model states, compress the checkpoint images, and stage the compressed checkpoint images in system memory 216 and or persistent store 214 using a process flow as described in further detail below with reference to FIG. 5. For example, the checkpoint optimization control functions 212-1 comprise checkpoint image scheduling control functions which are configured to select a given one of the GPU devices GPU0, GPU1, GPU2, GPU3 and GPU4 to generate and compress a checkpoint image of an intermediate DL model stored in its GPU memory, as well as other functions discussed herein.

Figure 4:
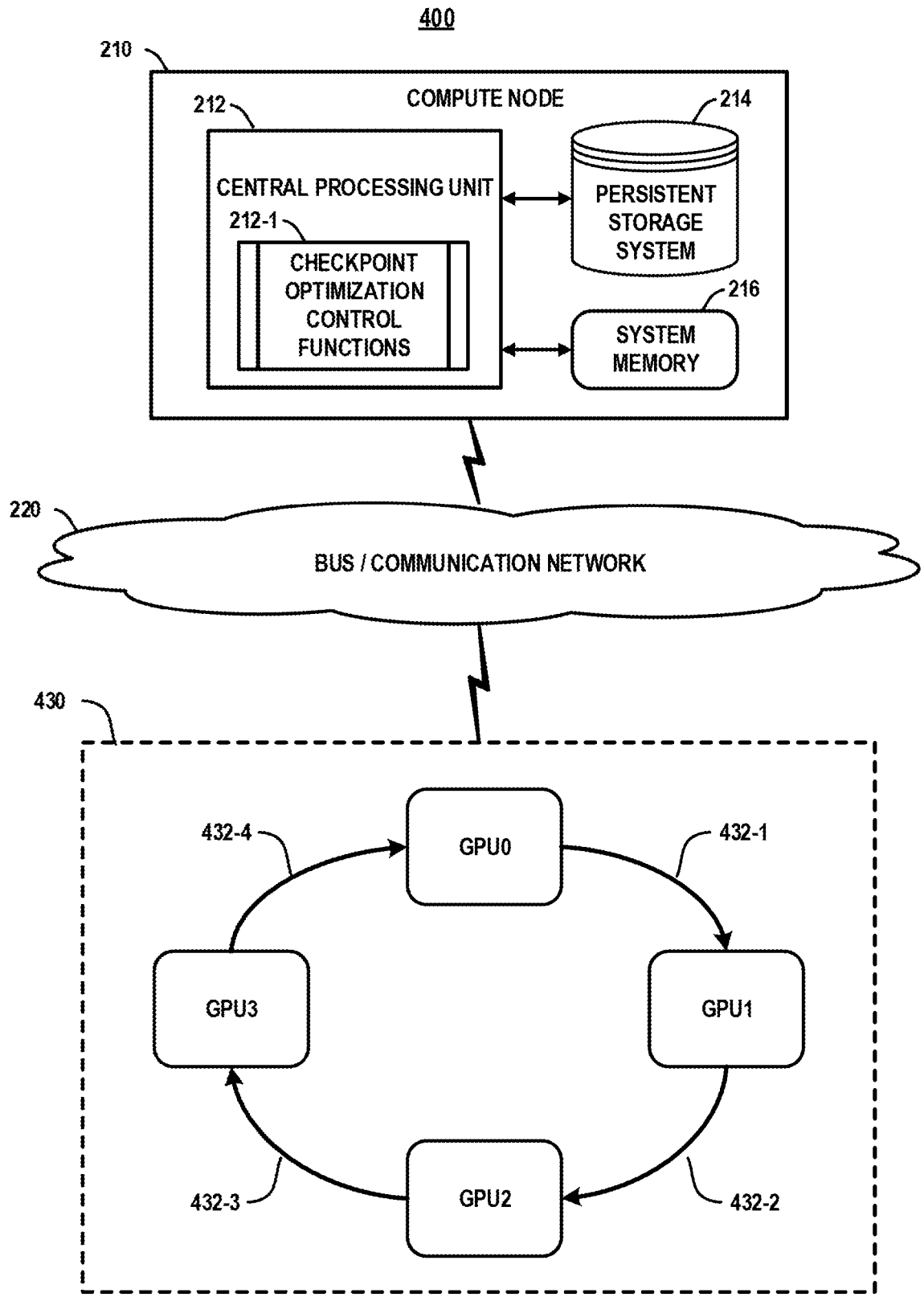
FIG. 4 schematically illustrates an exemplary implementation of the system of FIG. 1 to optimize checkpoint operations for a distributed DL training application using a decentralized cluster of GPU devices that exchange model parameters using a Ring AllReduce protocol, according to an embodiment of the invention.

FIG. 4 schematically illustrates an exemplary implementation of the system of FIG. 1 to optimize checkpoint operations for a distributed DL training application using a decentralized cluster of GPU devices that exchange model parameters using a Ring AllReduce protocol, according to an embodiment of the invention. In particular, FIG. 4 provides an alternative embodiment of using a decentralized cluster of GPU devices for parallelized training of a neural network using the known Ring AllReduce communication protocol. The Ring AllReduce protocol is a bandwidth-optimal collective communication method in which a cluster of GPU devices are configured in a logical ring with a specific order, and operate in a peer relationship. With the Ring AllReduce protocol, there is no central/dedicated parameter server, and each worker has a full copy of parameters, and synchronizes with its two neighbors in the communication ring in a clock-wise, or anticlockwise, direction. After two internal process stages (ScatterReduce and AllGather process stages), all GPU devices are synchronized.

In particular, FIG. 4 schematically illustrates a distributed computing system 400 comprising a control node 210, a bus/communication network 220, and a cluster 430 of GPU devices GPU0, GPU1, GPU2, and GPU3. The GPU devices GPU0, GPU1, GPU2, and GPU3 are configured in a logical communication ring with communication links 432-1, 432-2, 432-3, and 432-4 (collectively, communication lines 432) to communicate in a clockwise direction. In particular, GPU0 sends data to only GPU1 over the communication link 432-1, GPU1 sends data to only GPU2 over the communication link 432-2, GPU2 sends data to only GPU3 over the communication link 432-3, and GPU3 sends data to only GPU0 over the communication link 432-4. In one embodiment, the cluster 430 of GPU devices GPU0, GPU1, GPU2, and GPU3 reside on one physical GPU server node, wherein the communication links 432 comprise intra-node communication links implemented using, e.g., NVLink, PCIe, etc. In other embodiments, the cluster 430 of GPU devices GPU0, GPU1, GPU2, and GPU3 can reside one two or more physical GPU server nodes, wherein the communication links 432 comprise intra-node and inter-node communication links.

For each iteration of a distributed DL training operation using an Ring AllReduce process, each GPU device GPU0, GPU1, GPU2, GPU3 will receive an entire mini-batch dataset (of M data samples), and each GPU device partitions the entire mini-batch dataset into small chunks. In particular, for the ScatterReduce process, each GPU device GPU0, GPU1, GPU2, GPU3 in the logical communication ring will partition the mini-batch dataset (of M data samples) into N smaller chunks, where N is the number of GPUs in the ring. The GPUs will then perform N−1 iterations of the ScatterReduce process, where in each iteration, each GPU will send one of its data chunks to its right neighbor, and will receive a chunk from its left neighbor and accumulate the corresponding data chunks. The data chunk that is sent and received by each GPU is different in each iteration. At the end of the ScatterReduce stage, each GPU device GPU0, GPU1, GPU2, GPU3 will have one complete data chunk which comprises an accumulation of all final values in that chunk (i.e., the one complete data chunk includes the contribution from all the GPU devices GPU0, GPU1, GPU2, GPU3. In order to complete the AllReduce operation, the GPUs perform an AllGather process to exchange those data chunks, so that all at the completion of the AllGather process, each GPU device GPU0, GPU1, GPU2, GPU3 will have the fully accumulated values for the entire dataset.

As with the example embodiment of FIGS. 2 and 3 as discussed above, during execution of a DL training process by the distributed system 400, the CPU 212 of the control node 210 will execute program instructions of the checkpoint optimization module 130 (FIG. 1) to perform various checkpoint optimization control functions 212-1 to generate checkpoint images of intermediate DL model states, compress the checkpoint images, and stage the compressed checkpoint images in system memory 216 and or persistent store 214 using a process flow as described in further detail below with reference to FIG. 5. For example, the checkpoint optimization control functions 212-1 comprise checkpoint image scheduling control functions which are configured to select a given one of the GPU devices GPU0, GPU1, GPU2, and GPU3 within the GPU cluster 430 to generate and compress a checkpoint image of an intermediate DL model stored in its GPU memory, as well as other functions discussed herein.

FIG. 5 is a flow diagram of a method for performing checkpoint operations for a distributed DL training application, according to an embodiment of the invention. In some embodiments, the process flow of FIG. 5 illustrates exemplary operating modes of the computing systems shown in FIGS. 1, 2, 3, and 4. The process flow of FIG. 5 illustrates checkpoint optimization control functions that can be performed by a computing system when performing a distributed DL training task using a cluster of accelerator devices (e.g., GPU devices) across one or more worker nodes (block 500). During execution of the DL training process, a determination is made as to whether one or more predefined conditions have been met for performing a checkpoint operation to generate a checkpoint image of an intermediate DL model (block 502). For example, in one embodiment, a predefined checkpoint criterion may specify to generate a checkpoint of an intermediate DL model after a certain number (e.g., 100) of iterations of the DL training process have been completed. The predefined criterion or criteria for performing a checkpoint operation are configurable, and can be modified depending on the application and desired performance.

When the predefined condition(s) for performing a checkpoint operation have not yet been met (negative determination in block 502), the DL training process continues and the checkpointing process continues to monitor for the occurrence of event(s) that satisfy the predefined condition(s) for performing a checkpoint operation. When it is determined that the predefined condition(s) for performing a checkpoint operation have been met (affirmative determination in block 502), a determination is made as to whether there is an increase in the classification accuracy of the current intermediate DL model as compared to the classification accuracy of a previous intermediate DL model for which a checkpoint image was created and stored (block 504). The classification accuracy of the intermediate DL model can be determined by processing a set of known test samples using the intermediate DL model to classify the test samples, and determining an accuracy of the intermediate DL model as a percentage of the number of test samples that were properly classified as compared to the total number of test samples.

If it is determined that there is no increase in the classification accuracy of the current intermediate DL model as compared to the classification accuracy of the last stored checkpoint image of the previous intermediate DL model (negative determination in block 504), then no new checkpoint is created, and the DL training process continues (block 500) and the checkpointing process continues to monitor for the occurrence of event(s) that satisfy the predefined condition(s) for performing a checkpoint operation (block 502). With this configuration, if there is no increase in the classification accuracy of the current intermediate DL model as compared to the classification accuracy of the last stored checkpoint image of the previous intermediate DL model, then it would be a waste of computing and storage resources to create a new checkpoint image of the current intermediate DL model having decreased classification accuracy. In some embodiments, the increase in classification accuracy is determined based on a predefined threshold value, for example, wherein the classification accuracy is at least 1% greater than the classification accuracy of the previously stored checkpoint image of a previous intermediate DL model.

On the other hand, if it is determined that there is a sufficient increase in the classification accuracy of the current intermediate DL model as compared to the classification accuracy of the last stored checkpoint image of the previous intermediate DL model (affirmative determination in block 504), a checkpoint image of the current intermediate DL model is generated and a notification message is sent to the checkpoint scheduler module 132 to notify the checkpoint scheduler module 132 that a new checkpoint image is ready to be scheduled for compression (block 506). In one embodiment, the checkpoint copy scheduler is configured to select a target accelerator device (e.g., GPU device), which has the full intermediate DL model image, to perform a data compression operation on the checkpoint image. In some embodiments, the checkpoint scheduler module 132 will select/schedule a target accelerator device to execute the data compression operation for purposes of load balancing the various tasks being executed by the cluster of accelerator devices. In particular, in some embodiments, the checkpoint scheduler module 132 will select/schedule a target accelerator device to perform the checkpoint image compression operation using, for example, a round robin or load weighted round-robin load balancing protocol.

The checkpoint image of the DL model is compressed by executing a data compression operation by the accelerator device that is selected/scheduled by the checkpoint scheduler module 132 to perform the data compression operation (block 508). In one embodiment, the data compression operation is performed by executing a data compression kernel function on the selected accelerator device (e.g., GPU device). In another embodiment, the data compression operation is performed using a dedicated data compression hardware accelerator device under control of the checkpoint scheduler module 132. When the data compression operation is complete, the accelerator device will send a notification to the checkpoint scheduler module 132 that the new compressed checkpoint image is ready for a memory copy operation (block 510). The notification message will include information such as the memory address where the compressed checkpoint image is stored in device memory (e.g., GPU memory).

After the compressed checkpoint image is generated, the DL training process resumes (return to block 500). In particular, if the data compression operation is performed by a given accelerator device (e.g., GPU device) which is part of the accelerator device cluster performing the DL training process, the DL training process will resume after completion of the data compression operation. On the other hand, if the data compression operation is offloaded and performed by a dedicated data compression accelerator device, the DL training process can resume after the intermediate DL model is transferred to the data compression accelerator device and continue with the next learning iteration stage while the new checkpoint of the intermediate DL model is being compressed.

After receiving notification that the new compressed checkpoint image is ready for a memory copy operation, the checkpoint scheduler module 132 will communicate with the bandwidth monitor module 136 to determine a current bandwidth usage of the communication link(s) between a host CPU and the accelerator device having in-memory copy of the compressed checkpoint image to determine if there is sufficient bandwidth on the communication link(s) to transfer the compressed checkpoint image from device-to-host to perform the memory copy operation (block 512). In some embodiments, the determination of sufficient bandwidth is based on a configurable bandwidth usage threshold policy, e.g., at least 50% free bandwidth of total bandwidth of communication link, at least 4 GB/s available, etc. In this manner, the checkpoint scheduler module 132 can compare the determined (current) bandwidth usage of the communication link(s) with the predefined bandwidth usage threshold metric to determine if there is sufficient bandwidth to transfer the compressed checkpoint image over the communication link(s).

If the checkpoint scheduler module 132 determines that there is insufficient bandwidth available to perform the memory copy operation (negative determination in block 512), the checkpoint scheduler module 132 will schedule the checkpoint memory copy operation for execution at a subsequent, more optimal time (block 514). If the checkpoint scheduler module 132 determines that there is sufficient bandwidth available to perform the memory copy operation (affirmative determination in block 512), the checkpoint scheduler module 132 will issue a memory copy operation command (e.g., CUDA memcpyDevToHost API) to initiate the transfer of the in-memory copy of the compressed checkpoint image from the accelerator device memory to the host memory (block 516). The scheduling of the checkpoint memory copy operation (block 514) can be implemented in various ways. For example, in one embodiment, a pending memory copy operation can be placed on hold in a queue (e.g., FIFO queue) and then executed once sufficient bandwidth is determined to be available. In another embodiment, a pending memory copy operation can be executed at the expiration of a predefined period of time (e.g. 10 seconds) irrespective of whether there is sufficient bandwidth available, to ensure that the associate compressed checkpoint image will be copied to host memory and eventually copied to persistent storage for subsequent access and use, if needed.

When the memory copy operation is initiated and performed, the checkpoint scheduler module 132 will update the metadata in the metadata store, and the checkpoint image memory of the accelerator device will be freed or otherwise reallocated (block 518). The compressed checkpoint image staged in host memory can eventually be transferred to a specific directory in persistent storage (block 520). In one embodiment, the metadata will be updated to include the classification accuracy of the intermediate DL model associated with the new compressed checkpoint image transferred to host memory. In addition, the memory address of the new compressed checkpoint image in host memory and/or persistent storage can be stored as metadata.

Figure 6:
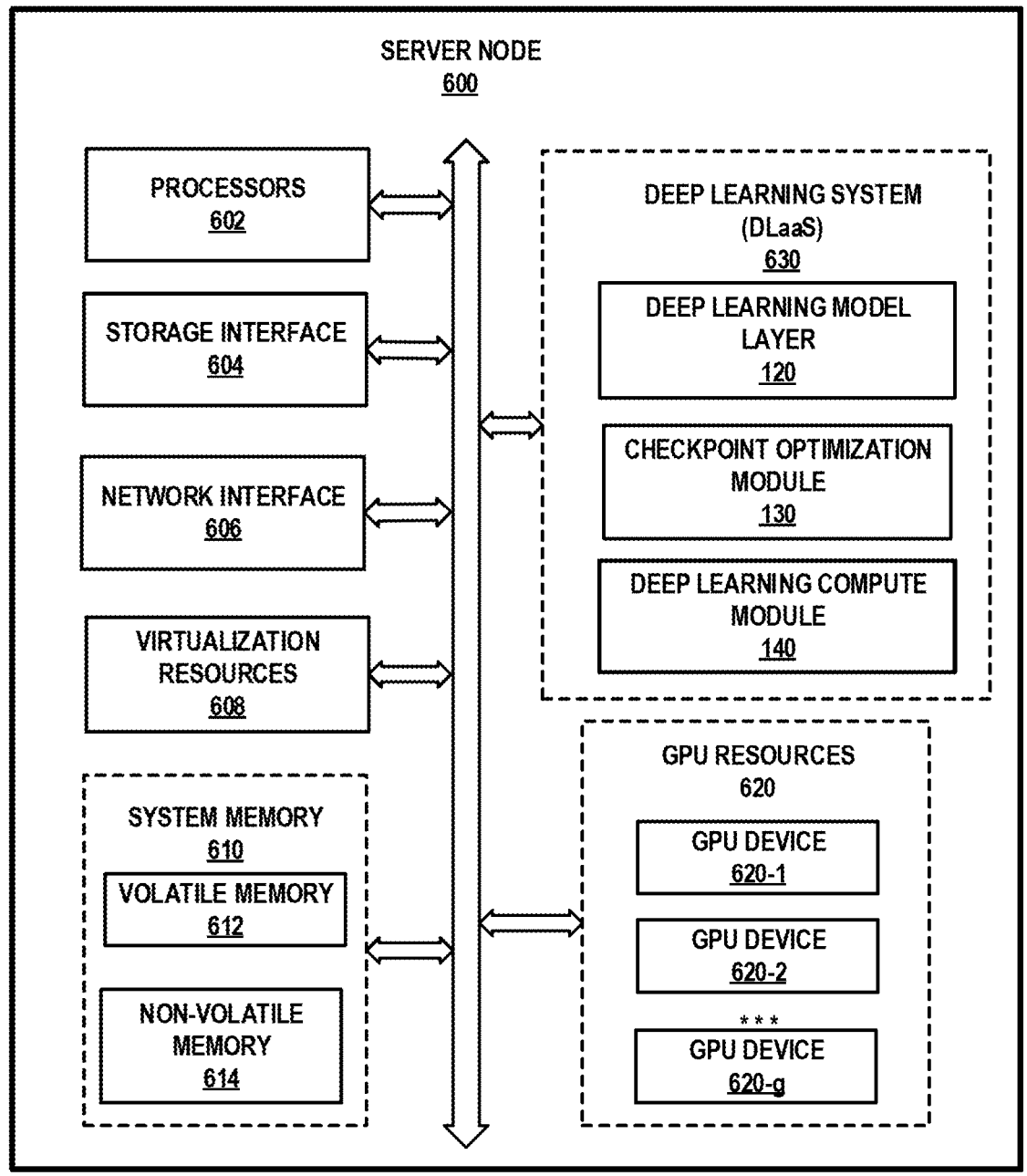
FIG. 6 schematically illustrates a server node which is configured to support optimized checkpoint operations for a distributed DL training application, according to an embodiment of the invention.

While FIG. 1 generically illustrates an HPC system 100 which implements a checkpoint optimization system according to an embodiment of the invention, the HPC system of FIG. 1 can be integrated with a cluster of GPU server nodes which are configured to implement a GPU-as-a-Service (GPUaaS) platform for deep learning computing or other HPC applications. For example, FIG. 6 schematically illustrates a server node 600 which comprises hardware processors 602, storage interface circuitry 604, network interface circuitry 606, virtualization resources 608, system memory 610, GPU resources 620, and a deep learning system 630. The system memory 610 comprises volatile memory 612 and non-volatile memory 614. The GPU resources 620 comprise one or more GPU devices 620-1, 620-2, . . . , 620-g. The deep learning system 630 comprises a software stack which is the same or similar to the software stack shown in FIG. 1 comprising the deep learning model layer 120, the checkpoint optimization module 130, and the deep learning compute module 140. In one embodiment, the deep learning system 630 is configured to implement a Deep Learning-as-a-Service (DLaaS) platform.

In one embodiment, the various system components 110, 120 and 130 of the deep learning system 630 comprise software modules that are persistently stored in a storage device and loaded into the system memory resources (e.g., volatile memory 612 and/or non-volatile memory 614), and executed by the processors 602 to perform respective functions as described herein. In this regard, the system memory 610 resources and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processors 602 may comprise one or more processors that are configured to process program instructions and data to execute a native operating system (OS) and applications that run on the GPU server node 600. For example, the processors 602 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 604 enables the processors 602 to interface and communicate with the system memory 610, and other local storage and off-infrastructure storage media, using one or more standard communication and/or storage control protocols to read data from or write data to volatile and non-volatile memory/storage devices. The network interface circuitry 606 enables the GPU server node 600 to interface and communicate with a network and other system components. The network interface circuitry 606 comprises network controllers such as network cards and resources (e.g., network interface cards, I/O adaptors, converged Ethernet adaptors, etc.) to support communication protocols and interfaces including, but not limited to, PCI Express (PCIe), direct memory access (DMA) and remote DMA (RDMA) data transfer protocols, etc.

The virtualization resources 608 can be instantiated to execute one or more applications or functions which are hosted by the GPU server node 600. For example, the virtualization resources 608 can be configured to implement the various modules and functionalities of the deep learning system 630. In one embodiment, the virtualization resources 608 comprise virtual machines that are implemented using a hypervisor platform which executes on the GPU server node 600, wherein one or more virtual machines can be instantiated to execute functions of the GPU server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices, of the GPU server node 600, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the GPU server node 600. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 610 comprises electronic storage media such as random-access memory (RAM), read-only memory (ROM), or other types of memory, in any combination. The term "memory" or "system memory" as used herein refers to volatile and/or non-volatile memory which is utilized to store application program instructions that are read and processed by the processors 602 to execute a native operating system and one or more applications hosted by the GPU server node 600, and to temporarily store data that is utilized and/or generated by the native OS and application programs running on the GPU server node 600. For example, the volatile memory 612 of the system memory 610 may be a dynamic random-access memory (e.g., DRAM) or other forms of volatile random-access memory. The non-volatile memory 614 may comprise a storage-class memory (SCM) that is accessible as a memory resource. For example, the non-volatile memory 614 may be a NAND Flash storage device, a SSD (solid state drive) storage device, or other types of next generation non-volatile memory (NGNVM) devices.

Figure 7:
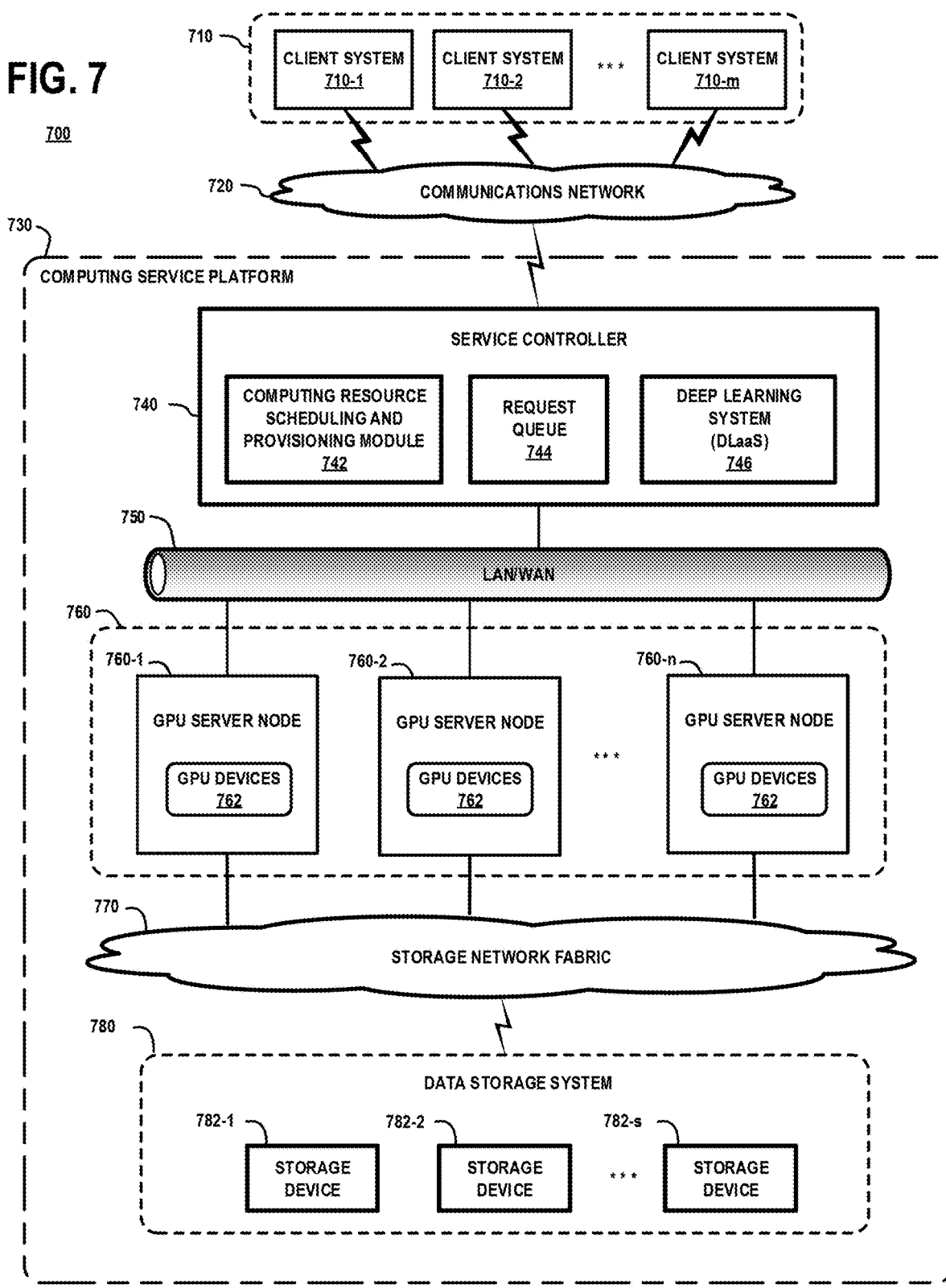
FIG. 7 is a high-level schematic illustration of a computing system which implements a cloud computing service platform configured to support optimized checkpoint operations for a DL computing service, according to an embodiment of the invention.

It is to be appreciated that the server node of FIG. 6 can be utilized in a cloud computing system to provide DLaaS as part of a Platform-as-Service (PaaS) cloud computing model that supports application development to customers for HPC applications including DL training and inference processing. For example, FIG. 7 is a high-level schematic illustration of a computing system 700 which implements a cloud computing service platform configured to support optimized checkpoint operations for a DL computing service, according to an embodiment of the invention. The computing system 700 comprises a plurality (m) of client systems 710-1, 710-2, . . . , 710-m (collectively referred to as client systems 710), a communications network 720, and a cloud computing service platform 730 which can be accessed by the client systems 710 over the communications network 720. The cloud computing service platform 730 comprises a service controller 740 (e.g., a control server node), a service platform network 750, a server cluster 760 (e.g., server farm) comprising a plurality (n) of GPU server nodes 760-1, 760-2, . . . , 760-n, a storage network fabric 770, and a data storage system 780 comprising a plurality (s) of data storage devices 782-1, 782-2, . . . , 782-s. The service controller 740 comprises a computing resource scheduling and provisioning module 742, a request queue 744, and a deep learning system 746 (which supports DLaaS). The GPU server nodes 760-1, 760-2, . . . , 760-n comprise GPU devices 762, as well as other possible computing resources including, but not limited to, CPUs, FPGA devices, ASIC devices, tensor processing units (TPUs), image processing units (IPUs), and other hardware accelerator systems that are configured to support the HPC service(s) provided by the cloud computing service platform 730. The server cluster 760 comprises a heterogeneous cluster of GPU server nodes which can have different hardware and network connection topologies/configurations, although GPU server nodes 760-1, 760-2, . . . , 760-n can be implemented using the same or similar architecture as the server node 600 of FIG. 6. Furthermore, the GPU server nodes 760-1, 760-2, . . . , 760-n of the server cluster 760 may implement one of many types of commercially available server operating systems including, but not limited to, a Windows server, a Sun Solaris server, an HP server, a Linux server, etc.

The client systems 710 comprise various types of computing devices such as desktop computers, laptop computers, electronic tablets, etc. In another embodiment, the client systems 710 may comprise servers in a data center which require GPU processing services. The communications network 720 is configured to enable network communication between the client systems 710 and the service platform 730. While the communications network 720 is generically depicted in FIG. 7, it is to be understood that the communications network 720 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 720 in some embodiments comprises combinations of multiple different types of communications networks each comprising network devices configured to communicate using Internet Protocol (IP) or other related communication protocols. The network 720 comprises intermediate points (such as routers, switches, etc.) and other elements that form a network backbone to establish communication paths and enable communication between network endpoints.

The service platform network 750 is configured to enable communication between the service controller 740 and the GPU server nodes 760-1, 760-2, . . . , 760-*n* of the server cluster 760, as well as to enable peer-to-peer network communication between the GPU server nodes 760-1, 760-2, . . . , 760-*n* within the server cluster 760. Depending on the network distribution and geographic location of the constituent components and nodes of the service platform 730, the service platform network 750 may comprise, for example, a LAN, a WAN, or a combination of one or more LANs and WANs, as well as other types of communications networks that are commonly used to implement cloud computing platforms. The storage network fabric 770 can be implemented using any suitable networking system and protocol to enable shared access to the data storage system 780 by the GPU server nodes 760-1, 760-2, . . . , 760-*n* of the server cluster 760. In one embodiment, the service platform network 750 and the storage network fabric can be integrated into a converged framework such as a converged Ethernet framework using known techniques.

The data storage system 780 can be implemented using any suitable data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. The data storage devices 782-1, 782-2, . . . , 782-*s* comprise non-volatile storage media to provide persistent storage resources for the GPU server nodes 760-1, 760-2, . . . , 760-*n* of the server cluster 760 (e.g., to store training data used for deep learning applications). The data storage devices 782-1, 782-2, . . . , 782-*s* may include one or more different types of persistent storage devices, or data storage arrays, such as hard disk drives (HDDs) or solid-state drives (SSDs), or other types and combinations of non-volatile memory. In one embodiment, the data storage devices 782-1, 782-2, . . . , 782-*s* are implemented using, for example, an enterprise-class storage platform comprising high performance, scalable storage arrays, which can be implemented for hyper-scale computing systems.

The cloud computing service platform 730 can be a private or public cloud computing platform which implements a PaaS system to provide computing services to end-users or customers for HPC applications such as deep learning applications, machine learning, Big Data processing applications, or other types of HPC applications that are typically implemented using a cloud-based PaaS system deliver consumer or business applications and services to multiple end users, service providers, and/or organizations. The service controller 740 is configured to control various functionalities of the cloud computing platform 730 to support PaaS management operations. For example, as shown in FIG. 7, the service controller 740 is configured to control and manage the deep learning system 746 to provide a cloud-based DLaaS. In one embodiment, the deep learning system 746 implements a deep learning computing platform which is the same or similar to the deep learning computing platform 110 of FIG. 1, which provides DL model checkpoint optimization functionalities, as discussed above. In one embodiment, the deep learning system 746 supports various deep learning frameworks such as Caffe, Torch, TensorFlow, etc., in scalable manner.

The service controller 740 receives service requests from the client systems 710 for executing HPC jobs on the server cluster 760 (e.g., distributed DL training, or other HPC jobs), and the received service requests are stored in the request queue 744. The service controller 740 utilizes the computing resource scheduling and provisioning module 742 to schedule and provision computing resources in the server cluster 760 for jobs pending in the request queue 744. A service request can include various user-specified conditions and demands for executing a given job (e.g., DL training) associated with the service request. For example, a service request may specify (i) a desired number (N) of accelerator devices (e.g., GPU devices) to provision for the requested job, (ii) a specific type/model of accelerator device (e.g., NVidia P100 GPU, Tensor flow TPU, etc.) to be utilized for the requested job, (iii) whether the provisioned accelerator devices should be exclusively allocated for the requested job or can be shared with other jobs, and/or (iv) other conditions based on a service level agreement (SLA) with the given client. In addition, the provisioning of accelerator resources for pending jobs can be based on predefined policies of the service provider for handing specific types of jobs.

The service request and associated provisioning specifications are stored in the request queue 744 pending scheduling by the computing resource scheduling and provisioning module 742. The underlying infrastructure of server resources (e.g., server cluster 760), networking resources (e.g., LAN/WAN 750, storage network fabric 770), and data storage resources (e.g., data storage system 780 and storage devices 782) is configured to provide a cloud-based Infrastructure-as-a-Service (IassS) platform, which comprises a heterogeneous cluster of resources that are utilized by the computing resource scheduling and provisioning module 742 to provision a set of resources (e.g., hardware accelerator devices) needed to execute pending jobs in the request queue 744.

The computing resource scheduling and provisioning module 742 can implement any suitable method or protocol for selecting, allocating, scheduling and provisioning one or more GPU server nodes and associated accelerator device (e.g., GPU devices) for executing HPC workloads associated with client service requests, depending on various factors including, but not limited to, the available GPU devices and processing resources of the GPU server nodes, the nature of the GPU processing tasks associated with the service request, user-specified conditions and resource demands for executing a given job, conditions based on a service level agreement (SLA) with the given client, predefined policies of the service provider for handing specific types of jobs, etc.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
executing a distributed deep learning (DL) model training process to train a DL model using a plurality of accelerator devices residing on one or more server nodes of a computing system, wherein the distributed DL model training process comprises multiple iterations, wherein each iteration other than an initial iteration results in generation of an intermediate DL model which is an updated version of a previous intermediate DL model that is generated in conjunction with a previous iteration, and wherein a final iteration results in generation of a final DL model; and
performing a checkpoint operation for the distributed DL model training process to generate and store a checkpoint image of a given intermediate DL model which is generated in conjunction with a given iteration of the distributed DL model training process prior to the final iteration, wherein performing the checkpoint operation comprises:
  accessing an in-memory image of the given intermediate DL model from a memory of a given accelerator device of the plurality of accelerator devices in which the given intermediate DL model is stored;
  compressing the in-memory image of the given intermediate DL model to generate a compressed checkpoint image and storing the compressed checkpoint image in the memory of the given accelerator device;
  scheduling a time to perform a memory copy operation to transfer a copy of the compressed checkpoint image from the memory of the given accelerator device to a host system memory, wherein the scheduling is performed based at least in part on a bandwidth usage of a communication link of the computing system, which is to be utilized to transfer the compressed checkpoint image from the memory of the given accelerator device to the host system memory to perform the memory copy operation; and
  performing the memory copy operation at the scheduled time.

2. The method of claim 1, further comprising initiating a checkpoint operation for the distributed DL model training process when a condition for performing the checkpoint operation has been met, wherein the condition for performing the checkpoint operation comprises a completion of a predefined number of iterations of the DL model training process.

3. The method of claim 1, wherein compressing the in-memory image of the given intermediate DL model to generate the compressed checkpoint image comprises:
selecting an accelerator device among the plurality of accelerator devices to compress the in-memory image of the given intermediate DL model; and
loading a data compression kernel for execution by the selected accelerator device to compress the in-memory image of the given intermediate DL model.

4. The method of claim 1, wherein compressing the in-memory image of the given intermediate DL model to generate the compressed checkpoint image comprises utilizing a dedicated data compression accelerator device to generate the compressed checkpoint image.

5. The method of claim 1, wherein performing the checkpoint operation further comprises:
determining a classification accuracy of the given intermediate DL model;
comparing the determined classification accuracy of the given intermediate DL model to a classification accuracy of a last stored compressed checkpoint image of a previous intermediate DL model; and
compressing the in-memory image of the given intermediate DL model in response to determining that the classification accuracy of the given intermediate DL model exceeds the classification accuracy of the last stored compressed checkpoint image of the previous intermediate DL model.

6. The method of claim 1, wherein scheduling the time to perform the memory copy operation comprises:
receiving notification that the compressed checkpoint image is stored in the memory of the given accelerator device;
determining a current bandwidth usage of the communication link of the computing system, which is to be utilized to transfer the compressed checkpoint image to perform the memory copy operation;
comparing the determined bandwidth usage of the communication link with a predefined bandwidth usage threshold to determine if there is sufficient bandwidth to transfer the compressed checkpoint image over the communication link to perform the memory copy operation; and
initiating the memory copy operation responsive to a determination that there is sufficient bandwidth to transfer the compressed checkpoint image over the communication link.

7. The method of claim 6, wherein scheduling the time to perform the memory copy operation further comprises placing the memory copy operation in a pending state for execution at a subsequent time when it is determined that there is sufficient bandwidth to transfer the compressed checkpoint image over the communication link.

8. The method of claim 7, wherein scheduling the time to perform the memory copy operation further comprises initiating the pending memory copy operation upon the expiration of a predetermined period of time irrespective of whether there is sufficient bandwidth to transfer the compressed checkpoint image over the communication link.

9. The method of claim 1, wherein the plurality of accelerator devices comprises graphics processing unit (GPU) devices.

10. An article of manufacture comprising a processor-readable storage medium having stored program code of one or more software programs, wherein the program code is executable by one or more processors to implement method steps comprising:
executing a distributed deep learning (DL) model training process to train a DL model using a plurality of accelerator devices residing on one or more server nodes of a computing system, wherein the distributed DL model training process comprises multiple iterations, wherein each iteration other than an initial iteration results in generation of an intermediate DL model which is an updated version of a previous intermediate DL model that is generated in conjunction with a previous iteration, and wherein a final iteration results in generation of a final DL model; and performing a checkpoint operation for the distributed DL model training process to generate and store a checkpoint image of a given intermediate DL model which is generated in conjunction with a given iteration of the distributed DL model training process prior to the final iteration, wherein performing the checkpoint operation comprises:
  accessing an in-memory image of the given intermediate DL model from a memory of a given accelerator device of the plurality of accelerator devices in which the given intermediate DL model is stored;
  compressing the in-memory image of the given intermediate DL model to generate a compressed checkpoint image and storing the compressed checkpoint image in the memory of the given accelerator device;
  scheduling a time to perform a memory copy operation to transfer a copy of the compressed checkpoint image from the memory of the given accelerator device to a host system memory, wherein the scheduling is performed based at least in part on a bandwidth usage of a communication link of the computing system, which is to be utilized to transfer the compressed checkpoint image from the memory of the given accelerator device to the host system memory to perform the memory copy operation; and
  performing the memory copy operation at the scheduled time.

11. The article of manufacture of claim 10, further comprising executable program code for initiating a checkpoint operation for the distributed DL model training process when a condition for performing the checkpoint operation has been met, wherein the condition for performing the checkpoint operation comprises a completion of a predefined number of iterations of the DL model training process.

12. The article of manufacture of claim 10, wherein compressing the in-memory image of the given intermediate DL model to generate the compressed checkpoint image comprises:
  selecting an accelerator device among the plurality of accelerator devices to compress the in-memory image of the given intermediate DL model; and
  loading a data compression kernel for execution by the selected accelerator device to compress the in-memory image of the given intermediate DL model.

13. The article of manufacture of claim 10, wherein compressing the in-memory image of the given intermediate DL model to generate the compressed checkpoint image comprises utilizing a dedicated data compression accelerator device to generate the compressed checkpoint image.

14. The article of manufacture of claim 10, wherein performing the checkpoint operation further comprises:
  determining a classification accuracy of the given intermediate DL model;
  comparing the determined classification accuracy of the given intermediate DL model to a classification accuracy of a last stored compressed checkpoint image of a previous intermediate DL model; and
  compressing the in-memory image of the given intermediate DL model in response to determining that the classification accuracy of the given intermediate DL model exceeds the classification accuracy of the last stored compressed checkpoint image of the previous intermediate DL model.

15. The article of manufacture of claim 10, wherein scheduling the time to perform the memory copy operation comprises:
  receiving notification that the compressed checkpoint image is stored in the memory of the given accelerator device;
  determining a current bandwidth usage of the communication link of the computing system, which is to be utilized to transfer the compressed checkpoint image to perform the memory copy operation;
  comparing the determined bandwidth usage of the communication link with a predefined bandwidth usage threshold to determine if there is sufficient bandwidth to transfer the compressed checkpoint image over the communication link to perform the memory copy operation; and
  initiating the memory copy operation responsive to a determination that there is sufficient bandwidth to transfer the compressed checkpoint image over the communication link.

16. The article of manufacture of claim 15, wherein scheduling the time to perform the memory copy operation further comprises:
  placing the memory copy operation in a pending state for execution at a subsequent time when it is determined that there is sufficient bandwidth to transfer the compressed image over the communication link; and
  initiating the pending memory copy operation upon the expiration of a predetermined period of time irrespective of whether there is sufficient bandwidth to transfer the compressed checkpoint image over the communication link.

17. The article of manufacture of claim 10, wherein the plurality of accelerator devices comprises graphics processing unit (GPU) devices.

18. A computing system, comprising:
  a server cluster comprising a plurality of server nodes, wherein the server nodes comprise accelerator devices;
  a control server node comprising a memory to store program instructions, and a processor to execute the stored program instructions to cause the control server node to perform a process which comprises:
  executing a distributed deep learning (DL) model training process to train a DL model using a plurality of accelerator devices residing on one or more server nodes of the computing system, wherein the distributed DL model training process comprises multiple iterations, wherein each iteration other than an initial iteration results in generation of an intermediate DL model which is an updated version of a previous intermediate DL model that is generated in conjunction with a previous iteration, and wherein a final iteration results in generation of a final DL model; and
  performing a checkpoint operation for the distributed DL model training process to generate and store a checkpoint image of a given intermediate DL model which is generated in conjunction with a given iteration of the distributed DL model training process prior to the final iteration, wherein performing the checkpoint operation comprises:
    accessing an in-memory image of the given intermediate DL model from a memory of a given accelerator device of the plurality of accelerator devices in which the given intermediate DL model is stored;
    compressing the in-memory image of the given intermediate DL model to generate a compressed checkpoint image and storing the compressed checkpoint image in the memory of the given accelerator device;
    scheduling a time to perform a memory copy operation to transfer a copy of the compressed checkpoint image from the memory of the given accelerator device to a host system memory, wherein the scheduling is performed based at least in part on a bandwidth usage of a communication link of the computing system, which is to be utilized to transfer the compressed checkpoint image from the memory of the given accelerator device to the host system memory to perform the memory copy operation; and performing the memory copy operation at the scheduled time.

19. The computing system of claim 18, wherein scheduling the time to perform the memory copy operation comprises:

receiving notification that the compressed checkpoint image is stored in the memory of the given accelerator device;

determining a current bandwidth usage of the communication link of the computing system, which is to be utilized to transfer the compressed checkpoint image to perform the memory copy operation;

comparing the determined bandwidth usage of the communication link with a predefined bandwidth usage threshold to determine if there is sufficient bandwidth to transfer the compressed checkpoint image over the communication link to perform the memory copy operation; and initiating the memory copy operation responsive to a determination that there is sufficient bandwidth to transfer the compressed checkpoint image over the communication link.

20. The computing system of claim 19, wherein scheduling the time to perform the memory copy operation further comprises:

placing the memory copy operation in a pending state for execution at a subsequent time when it is determined that there is sufficient bandwidth to transfer the compressed image over the communication link; and initiating the pending memory copy operation upon the expiration of a predetermined period of time irrespective of whether there is sufficient bandwidth to transfer the compressed checkpoint image over the communication link.

* * * * *